United States Patent [19]

Hirataka et al.

[11] Patent Number: 5,179,457
[45] Date of Patent: Jan. 12, 1993

[54] LIQUID CRYSTAL DISPLAY DEVICE WITH BIREFRINGENT FILM BETWEEN THE SUBSTRATES OF THE LIQUID CRYSTAL

[75] Inventors: Jun-ichi Hirataka, Hitachi; Katsumi Kondo, Katsuta; Yasushi Tomioka; Shuji Imazeki, both of Hatoyama; Yoshio Taniguchi, Hino, all of Japan

[73] Assignee: Hitachi, Ltd., Tokyo, Japan

[21] Appl. No.: 584,623

[22] Filed: Sep. 19, 1990

[30] Foreign Application Priority Data

Sep. 20, 1989 [JP] Japan ................. 1-242048

[51] Int. Cl.$^5$ .......................... G02F 1/1335
[52] U.S. Cl. ........................................ 359/73
[58] Field of Search ............. 350/347 R, 339 R; 359/73, 74

[56] References Cited

U.S. PATENT DOCUMENTS

| | | | |
|---|---|---|---|
| 3,900,248 | 8/1975 | Nagasaki | 350/335 |
| 4,025,161 | 5/1977 | La Roche | 350/347 R |
| 4,093,356 | 6/1978 | Bigelow | 350/338 |
| 4,139,272 | 2/1979 | Laesser et al. | 350/337 |
| 4,711,532 | 12/1987 | Choe | 350/355 |
| 4,844,569 | 7/1989 | Wada et al. | 350/347 R |
| 4,889,412 | 12/1989 | Clerc et al. | 350/347 R |
| 4,936,654 | 6/1990 | Suzaki et al. | 350/347 R |

FOREIGN PATENT DOCUMENTS

| | | |
|---|---|---|
| 0352724 | 1/1990 | European Pat. Off. . |
| 2651062 | 5/1977 | Fed. Rep. of Germany . |
| 33141632 | 10/1984 | Fed. Rep. of Germany . |
| 3033719 | 2/1991 | Japan ................. 359/73 |
| 1470523 | 4/1977 | United Kingdom ....... 359/73 |

Primary Examiner—William L. Sikes
Assistant Examiner—Anita Pellman Gross
Attorney, Agent, or Firm—Kenyon & Kenyon

[57] ABSTRACT

A liquid crystal display device includes a phase-plate disposed between a pair of substrates, preferably inside of the electrode, to increase the transmission rate and improve the contrast ratio of the display.

15 Claims, 7 Drawing Sheets

| A | B | C | A |
|---|---|---|---|
| B | C | A | B |
| C | A | B | C |

FIG. 2(e)

| C | D | C | D |
|---|---|---|---|
| A | B | A | B |
| C | D | C | D |
| A | B | A | B |

FIG. 2(f)

| A | B | C | A |
|---|---|---|---|
| B | C | A | B |
| C | A | B | C |

LIQUID CRYSTAL DISPLAY DEVICE WITH BIREFRINGENT FILM BETWEEN THE SUBSTRATES OF THE LIQUID CRYSTAL

BACKGROUND OF THE INVENTION

1. Field of the Invention

The present invention relates to liquid crystal display devices. More particularly, the present invention relates to liquid crystal display devices capable of black and white and color displaying.

The present invention also relates to a film with areas of differing optical retardation. More particularly, the present invention relates to such a film having a pattern of such areas of differing optical retardation.

Furthermore, the present invention relates to a new use of polydiacetylene. Yet more specifically, the present invention relates to a new use of polydiacetylene film.

2. Description of Related Art

A conventional liquid crystal display device having a time-sharing drive characteristic has a low transmission rate. Therefore, with so-called reflection type liquid crystal display devices, a color display was difficult. A reflection type liquid crystal display device is described in Japanese Patent Application Laid-Open No. 60-252325 (1985).

Linearly polarized light going through a conventional liquid crystal cell, e.g. a liquid crystal cell with twisted nematic liquid crystal material, was not only changed in its polarization direction, but had an elliptical distribution of the electrical vector as well. The changes to the line only polarized light in interference coloring of the light composed of the linearly polarized light and of the elliptically polarized light. To solve this problem U.S. Pat. No. 4,443,065 proposes to use, outside of the liquid crystal cell having control electrodes, a second liquid crystal layer with twisted nematic liquid crystal, such that the twist direction of the two liquid crystal layers are arranged in opposite directs. The retardation d*Δn is the same for each of the two layers. The longitudinal axis of liquid crystal molecules in the two liquid crystal layers are at 90° to each other.

In U.S. Pat. No. 4,844,569 a similar device is described. In this patent, an optically anisotropic layer with opposite twist sense for the rotation of the polarized light between the liquid crystal cell and the polarizer is described. Among the optically anisotropic materials available, U.S. Pat. No. 4,844,569 describes stretched film of polyvinylalcohol. This patent also describes the use of two optically anisotropic layers, one on each side of the liquid crystal cell.

SUMMARY OF THE INVENTION

In the conventional reflection type liquid crystal display devices, both polarization plates were disposed outside the liquid crystal element so that light had to pass through the transparent electrode and the substrate, respectively, twice. Therefore, attenuation of transmission rate therefore was large and the display became dark. Also, additional layers of films outside the liquid crystal cell required adhesives and resulted in boundary problems.

An object of the present invention is to provide a liquid crystal display device having an enhanced transmission rate, capable of displaying in black and white and in color, having an improved contrast ratio and having an excellent time-sharing drive characteristic.

Another object of the invention is to provide a new optically anisotropic material.

A yet further object of the invention is to provide a new means of color display.

The above-mentioned objects are accomplished and the technical problems solved by features and feature combinations contained in the claims.

In one embodiment of the present invention, a polarization plate and a phase-plate or one of them is arranged between a pair of substrates, preferably at the inside of an electrode.

Normally, a liquid crystal display device having an excellent time-sharing drive characteristic has a low transmission rate and is not suitable for a reflection type liquid crystal display device. By providing a phase-plate between a pair of substrates, preferably inside of the electrode, the transmission rate is increased and the constrast ratio is possibly improved as well.

Another embodiment of the present invention relates to an optical birefringent device having a solid layer-type structure substantially transparent to the light employed. The optical birefringent device also has a pattern of areas of at least two different birefringent properties in the structure. The pattern of areas of the device is designed so the display of at least two different colors is possible in the respective areas of different birefringent properties. In other words, in a preferred embodiment of this device, the areas of different birefringent properties generate different colors from and the same light source. The light source is preferably switchable in at least some of the areas, e.g. by means of liquid crystal switch means, most preferably those described herein in more detail.

A yet further embodiment of the present invention resides in a birefringent film. This film consists essentially of polydiacetylene. The polydiacetylene molecules in this film, are oriented predominantly parallel to each other. More particularly and preferably they are all oriented in one direction. The film is substantially uncolored, transparent and birefringent and has adhesive properties. The film, therefore, without requiring any additional adhesive, will stick to surfaces, in particular to glass plates or to other layers conventionally employed in liquid crystal display devices. The adhesive properties are sufficient to keep the film in its position in an optical sandwich device and to keep it from shifting or turning. The film is preferably one produced by the technique of: floating the polymer molecules on a non-solvent and compressing the floating molecules, thereby creating a layer of oriented molecules: adhering such layer to the surface on which the film is to be produced; and repeating this operation until the desired film thickness has been reached. The preferred polydiacetylenes are those exemplified in table 1. In this table the general formula for the preferred polydiacetylenes is shown. The numeral n is usually and preferably in the range of 2-12, most preferably 2-10.

TABLE I $$+\!\!\begin{array}{c}R_1\\|\\C-C\equiv C-C\\|\\R_2\end{array}\!\!+_{\!\!n}$$

(a) $R_1 = R_2;\ -(CH_2)_3-O-\underset{\underset{O}{\|}}{C}-\underset{H}{\overset{|}{N}}-CH_2-\underset{\underset{O}{\|}}{C}-O-C_4H_9$ (b) $R_1 = R_2;\ -(CH_2)_4-O-\underset{\underset{O}{\|}}{C}-\underset{H}{\overset{|}{N}}-CH_2-\underset{\underset{O}{\|}}{C}-O-C_4H_9$ (c) $R_1 = R_2;\ -(CH_2)_m-O-\underset{\underset{O}{\|}}{C}-\underset{H}{\overset{|}{N}}-CH_2-\underset{\underset{O}{\|}}{C}-O-C_4H_9$
(m = 5 to 12)

(d) $R_1 = R_2;\ -CH_2-O-\underset{\underset{O}{\|}}{C}-\underset{H}{\overset{|}{N}}-C_2H_5$ (e) $R_1 = R_2;\ -CH_2-O-\underset{\underset{O}{\|}}{C}-\underset{H}{\overset{|}{N}}-C_6H_5$ (f) $R_1 = R_2;\ -(CH_2)_4-O-\underset{\underset{O}{\|}}{C}-\underset{H}{\overset{|}{N}}-C_2H_5$ (g) $R_1 = R_2;\ -(CH_2)_4-O-\underset{\underset{O}{\|}}{C}-\underset{H}{\overset{|}{N}}-C_6H_5$ (h) $R_1 = R_2;\ -(CH_2)_4-O-\underset{\underset{O}{\|}}{C}-\underset{H}{\overset{|}{N}}-CH-(CH_3)_2$ (i) $R_1 = R_2;\ -CH_2-O-SO_2-C_6H_4CH_3$ (j) $R_1 = R_2;\ -CH_2-O-SO_2-C_6H_5F$ (k) $R_1 = R_2;\ -(CH_2)_4OSO_2C_6H_4CH_3$ (l) $R_1 = R_2;\ -CH_2NC_{12}H_9$ (m) $R_1 = R_2;\ -C_6H_4NHCOCH_3$ (n) $R_1 = R_2;\ -(CH_2)_2OH$ (o) $R_1 = R_2;\ -CH_2CO_2(CH_2)_8CH_3$ (p) $R_1;\ -CH_3\quad R_2;\ -CH_2OH$ (q) $R_1;\ -(CH_2)_mCH_3$
$R_2;\ -(CH_2)_kCOOH$ (m = 3 to 16; k = 2 to 10)

(r) $R_1 = R_2;\ -C_6H_4OCO(CH_2)_3OCOC_6H_5$

Further preferred embodiments of the present invention are described in the form of examples with reference to the drawing, in which,

Hereinbelow, liquid crystal display device suitable for practicing the present invention is explained in detail with reference to the drawings.

DETAILED DESCRIPTION

EXAMPLE 1

FIG. 1 is a cross-sectional view of an element structure of a liquid crystal display device. According to the present invention, a liquid crystal is sandwiched between glass substrates 2 and 10, and a polarization plate 1 is disposed outside the glass substrate 2. Further, an electrode is disposed between each of the glass substrates 2 and 10 and the liquid crystal layer 5. The upper electrode 3 is a transparent electrode composed of a material such as indium tin oxide (ITO), while the lower electrode 9 need not necessarily be transparent, and thus may be a metal electrode such as chromium, aluminum and gold. Further a reflection plate such as aluminum oxide is to be disposed under the lower electrode 9. The above metal electrode can be served as the reflection plate as well. For enhancing reflectivity a white color paint may be applied thereon. Orientation layers or films 4 and 6 are in contact with the liquid crystal layer 5.

Figure 1A:
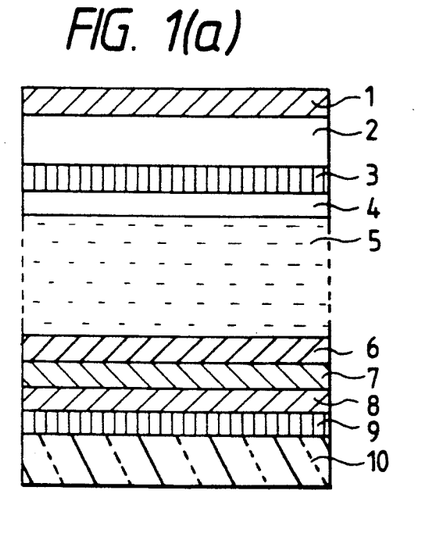
FIGS. 1a through 1f show, schematically, in cross-sectional view, various arrangements of the phase-plate within a liquid crystal display device.

Between the lower electrode 9 and an orientation film 6, a polarization plate 8, preferably formed of polydiacetylene film, is disposed. The polarization plate 8 may be formed as follows. A chloroform solution of 0.5 g/l compound a. in Table 1 (hereafter referred to as p-3 BCMU)) is prepared. This solution is developed in a few drops in a development vessel filled with pure water in an LB film-forming device. After completely volatizing the chloroform, the film is compressed from the opposing two directions at a compressing speed of 100 cm$^2$/min, and a monomolecular film having a surface pressure of 20 mN/m is formed. A p-3 BCMU oriented organic film thus prepared at the interface between gas and water is transferred to a substrate through horizontal adhesion method. The p-3 BCMU oriented organic film formed on the substrate is excellent in maintaining a high-orientation property of p-3 BCMU and has a film thickness of about 27 Å. The polarization plate is produced by repeating this operation several times (e.g., 30 times) and by superimposing the individual film layers with the orientation directions of the molecules being parallel to each other.

The transmission rate was measured with the luminescence meter 1980 B (a product of Photo Research Co.), and an improvement was observed. The transmission rate of the present invention was 40% while that of the conventional liquid crystal element was about 35%.

Further, between the lower polarization plate 8 and the orientation film 6, a polydiacetylene film phase-plate 7, shown in table 1, is disposed, so that the displayed color of the liquid crystal display device can be changed. A product, $\Delta n*d$, of between the difference of refractive index anisotropy $\Delta n$ and the thickness d of the phase-plate preferably satisfies the condition of 0.4 $\mu m \leq \Delta n*d \leq 1.5$ $\mu m$ in view of contrast, brightness and color.

Figure 1B:
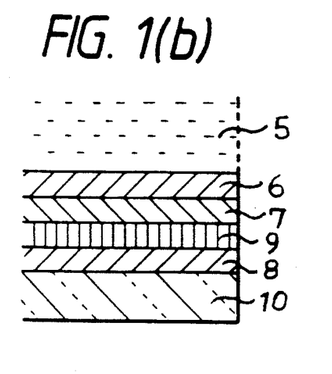
Figure 1C:
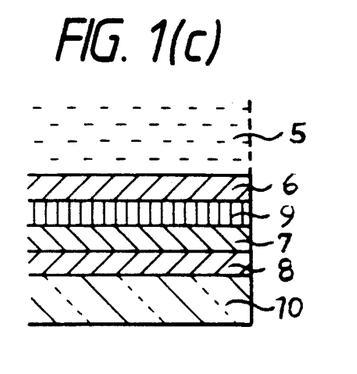

In a further embodiment of the present invention the position of the phase-plate 7 may be between the orientation film 6 and the ITO layer 9 as shown in FIG. 1b or between the polarization plate 8 and the ITO layer 9 as shown in FIG. 1c.

Figure 1D:
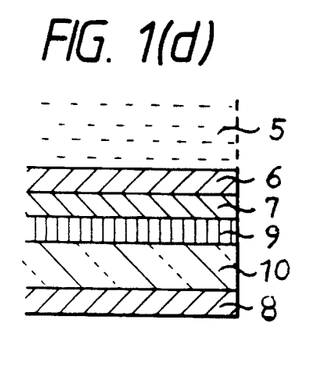
Figure 1E:
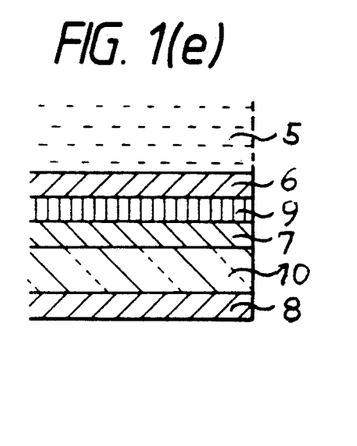
Figure 1F:
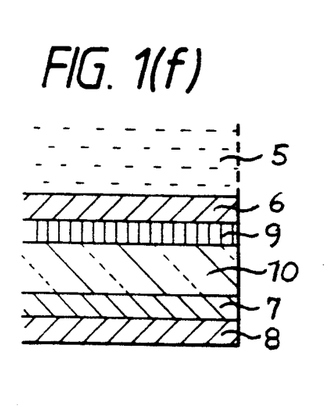

In a still further embodiment of the present invention G 1229 DU (tradename), a product of NITTO DENKOH, is employed for the lower polarization plate 8 as it is for the upper polarization plate. The position of the phase-plate 7 may be between the orientation film 6 and the ITO layer 9 as shown in FIG. 1d, between the ITO layer 9 and the glass 10 substrate as shown in FIG. 1e, or between the glass 10 substrate and the polarization plate 8 as shown in FIG. 1g. Further, the lower polarization plate may be arranged between the electrode and the upper glass substrate or on the outer side of the upper glass substrate. The reflection plate or layer (not separately shown) is usually arranged below the polarization layers 8.

EXAMPLE 2

Figure 2A:
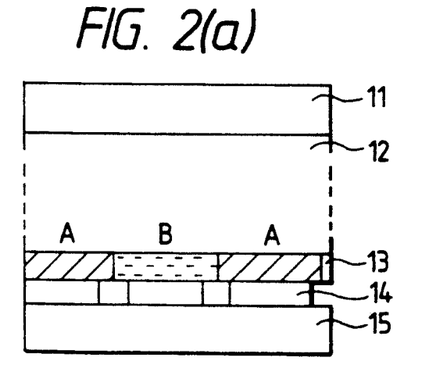
FIGS. 2a through 2f show, schematically, pattern arrangements of the birefringent film.

Another embodiment of the present invention is shown in FIGS. 2(a) through 2(f). In FIG. 2(a), a phase-plate 13, disposed between a liquid crystal layer 12 and a lower electrode 14, has different amounts of birefringence at position A and position B. The phase-plate 12 may possibly have no birefringence at one or more of its areas. For example, display color of the pixel having no birefringence is yellow, display color of the pixel having the product $\Delta n*d$ of 0.4 $\mu m$ to 1.0 $\mu m$ is violet, and the pixel display color having the product $\Delta n*d$ of 1.0 $\mu m$ to 1.5 $\mu m$ is blue. By combining of these three kinds of pixels a color display is attainable without using a color filter.

Figure 2B:
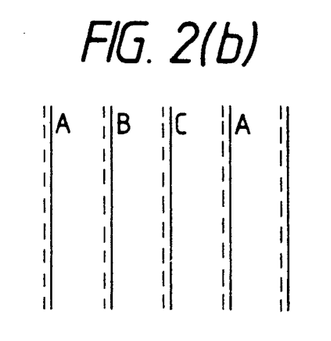
Figure 2C:
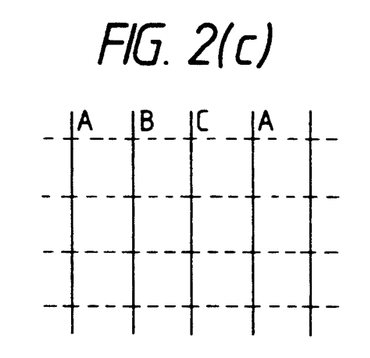
Figure 2D:
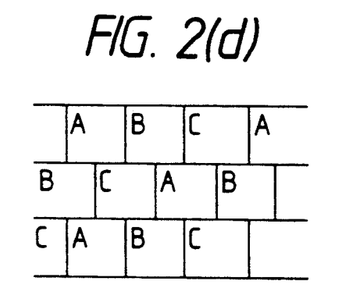
Figure 2E:
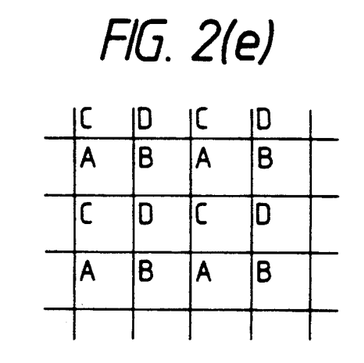
Figure 2F:
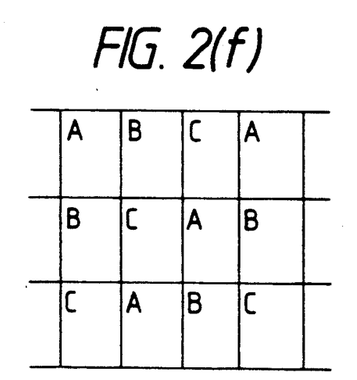

Further, the shape of the phase-plate on the pixel may be a stripe shape parallel to the electrode as shown in FIG. 2b, a stripe shape perpendicular to the electrode as shown in FIG. 2c, or a mosaic shape, some examples of which are shown in FIG. 2d, FIG. 2e and FIG. 2f.

The angle between the optical axis of the phase-plate and the polarization axis of the polarization plate is preferably about 10° to 80° and at 45° the transmission rate is maximized. For removing the birefringence, laser annealing is, for example, effective and preferred. Other features of this embodiment include those of Example 1.

EXAMPLE 3

Figure 5:
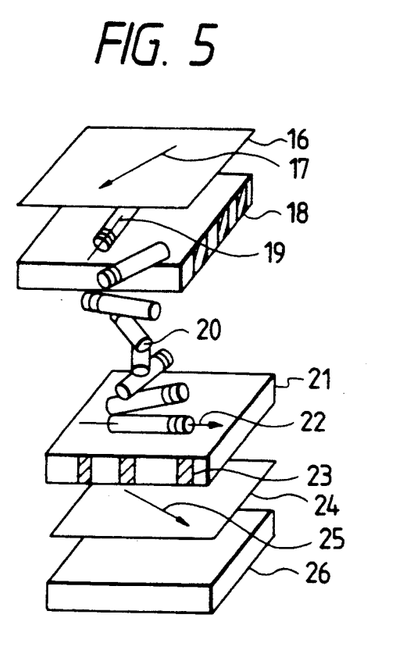
FIGS. 5 through 7 show, in exploded view, three liquid crystal display devices (in part) and their functioning.

Another embodiment of the present invention is shown in FIG. 5 which is a perspective view of a structure element of a liquid crystal device according to the present invention. The twisting direction and the twist angle $\alpha$ of a liquid crystal molecule 20 are defined by a rubbing direction 19 of an upper electrode substrate 18, a rubbing direction 22 of a lower electrode substrate 21 and the kind and amount of the optical rotation material added to the nematic liquid crystal.

The maximum value of the twist angle $\alpha$ is limited. This is because the turn-on condition near threshold value takes an orientation which scatters light, the upper limit being 300°. The lower value is also limited because of contrast, 180° being its limit.

The present embodiment provides a liquid crystal element which enables a black and white display, with a fully satisfactory contrast, with even more than 200 scanning lines, where the twist angle is defined as, e.g. 260°.

In this embodiment G 1229 DU, a product of NITTO DENKOH, is, for example, used for the polarization plate. An angle $\beta_1$ formed by the polarization axis 17 (or absorption axis) of the upper polarization plate 16 and the polarization axis 25 (or absorption axis) of the lower polarization plate 24 is defined to be nearly perpendicular or parallel. Further, an angle $\beta_2$, formed by the polarization axis (or absorption axis) 25 of the lower polarization plate 24 and the rubbing direction 22 of the lower electrode substrate 21, is to be preferably in the range of 30° to 60° (or 120° to 150°) to obtain good contrast, brightness and color. In the present embodiment, $\beta_1$ is selected as 135° and $\beta_2$ is selected as 45°. Further, the liquid crystal display element, according to the present embodiment, shows a noticeable dependence upon the product of $\Delta n*d$. When the condition of 0.4 $\mu m \leq \Delta n*d \leq 1.5$ $\mu m$ is satisfied (to obtain good contrast, brightness and color), the element exhibits particularly good properties. When this product is below 0.4 $\mu m$ the element exhibits a low transmission rate. When it is above 1.5 $\mu m$ the element exhibits a low display characteristic because of low contrast ratio.

The value $\Delta n$ depends on the wavelength of the light and this dependence will be larger at the short wavelength side and smaller at the long wavelength side. Values of $\Delta n$ used throughout the present specification were measured with an He-Ne laser beam (wavelength = 6328 Å) at a temperature of 25° C. In the present embodiment, the nematic liquid crystal comprises a liquid crystal of biphenyl-series (pentyl biphenyl cyanide) and a liquid crystal of the estercyclohexene series (alkyl-p-cyclohexyl-carboxy-p-phenyl cyanide) as its major components. A 0.5 wt. % of S 811 (tradename), a product of Merck, is added. This has an optical rotation property.

Further a liquid crystal having $\Delta n = 0.083$ is used in the present embodiment and the thickness of the liquid crystal layer is selected to be 6 $\mu m$ so that $\Delta n*d$ of the liquid crystal, according to the present embodiment, is defined as being 0.8.

Figure 6:
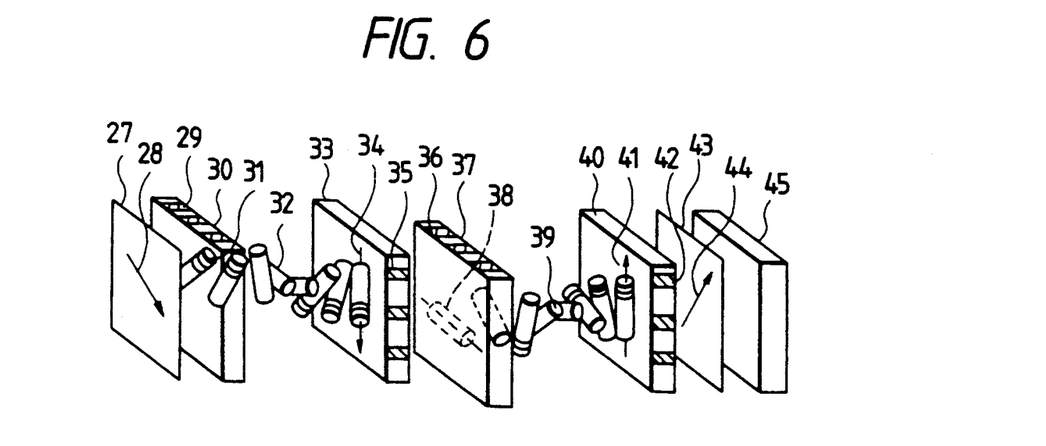

With the above constitution of the liquid crystal display element and of the polarization plate, the background and the display portions are colored. In accordance with the present invention, a second liquid crystal element for optical compensation is disposed between the liquid crystal display element and the upper polarization plate 21 as shown in FIG. 6. The twist angle is selected to be equal to the first liquid crystal element but opposite in twisting direction, namely −260°. The product $\Delta n*d$ is 0.8. Further a cold cathode ray tube is used as light sources 25 and 26 in the present embodiment, however, a hot cathode ray tube or electroluminescent source may be used. It is likely that no coloring will be obtained in an external light type element with a reflection plate which eliminates a light source.

EXAMPLE 4

Figure 7:
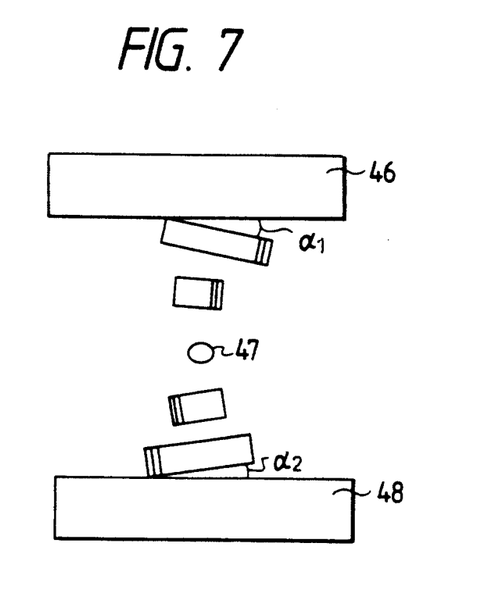
Figure 8:
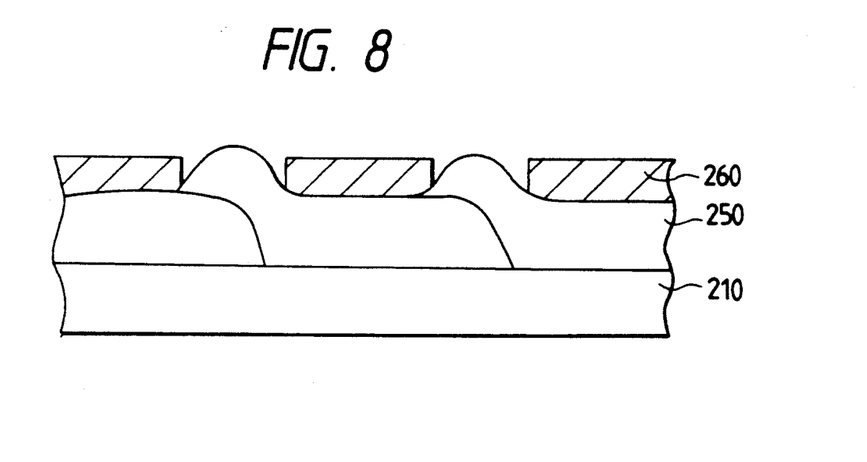
FIG. 8 shows the superimposing of a glass plate, color filter elements and electrode elements.

Another embodiment of the present invention is shown in FIGS. 7 and 8.

In FIG. 7, except for the fact that a color filter 250 is provided on the first liquid crystal element, the remaining constitution is the same as that shown in FIG. 1. FIG. 7 is a cross-sectional view of the first liquid crystal element. As is shown in FIG. 8 the angle $\alpha_2$, formed by a lower substrate 48 and a liquid crystal molecule 47, differs from the angle $\alpha_1$, formed by an upper substrate 46 and a liquid crystal molecule 47. It is preferable that the pretilt angle at the color filter side is in a range of 0° to 5° and it is preferable that the pretilt angle of the opposite substrate is in a range of 3° to 15°.

FIG. 8 shows a partial cross-sectional view of a cell with color filter 250. The color filter 250 is produced by pigment printing, electro-deposition or photolithography. The width of the pixels of red, blue and green is 90 μm. Each pixel mutually overlaps the other. The overlapping width and thickness corresponding respectively to the electrode interval and their thickness, and the substrate face being maintained flat. The surface between electrodes, without the filter on the substrate, is covered by a black matrix such as chromium on a transparent material such as a polyimide which is coated onto the surface so that the substrate face is flattened.

Figure 9:
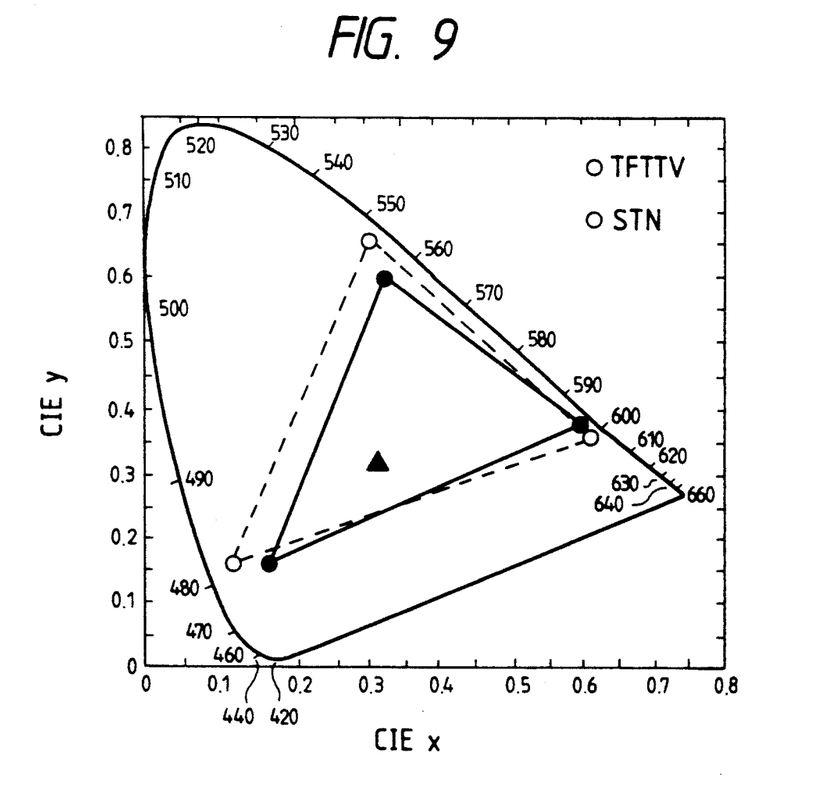
FIG. 9 shows a color diagram chart with three colors.

FIG. 9 shows a display color range of the present embodiment by using C I E color degree coordinates. In the drawing, the range of the color reproduceability was equivalent to that of a commercial color TV and the contrast ratio was 10:1.

The above description refers to a liquid crystal element using 260° twist angle. When the range for $\Delta n^*d$ of the liquid crystal element is 0.4 μm to 1.5 μm and the twist angle $\beta$ is selected as being 180° to 360° or more, no coloring of the background and good display color are achieved. Further, the liquid crystal element near the light source 19 is used for driving but the same is used as a compensation element.

EXAMPLE 5

Figure 3:
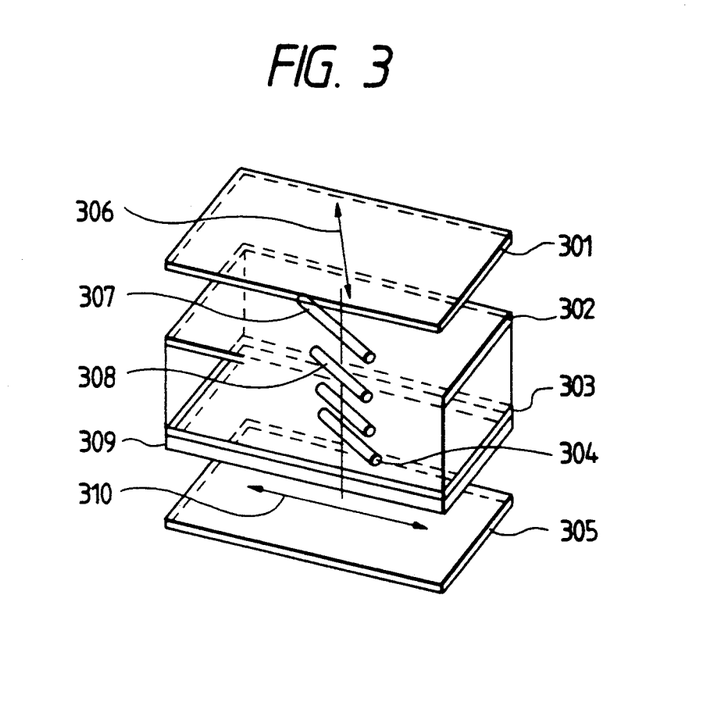
FIG. 3 shows, in exploded view, parts of a liquid crystal display device.
Figure 4:
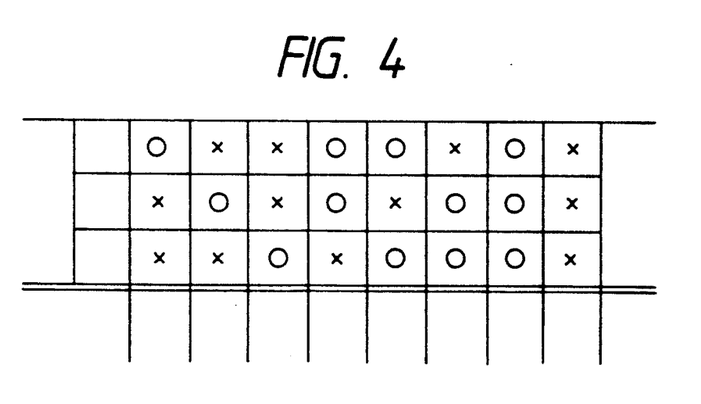
FIG. 4 shows the formation of eight colors by superimposing three layers capable of generating different individual colors.

Another embodiment of the present invention is shown in FIG. 3. Upper polarization plate 301, an upper substrate 302, a ferroelectric liquid crystal 308, a phaseplate 303, a lower substrate 309, and a lower polarization plate 305 are arranged in this order. The upper rubbing axis direction and the lower rubbing axis direction are the same. The present liquid crystal has no twisting property. The light absorption axis is indicated by numeral 306 at the upper side and by numeral 310 at the bottom side. In the present embodiment the ferroelectric liquid crystal is used as a liquid crystal. Other aspects of this embodiment is the same as for the Examples 1, 2 and 3. According to the present embodiment of the invention, phase correction is easily carried out and its response speed is high.

EXAMPLE 6

Figure 10:
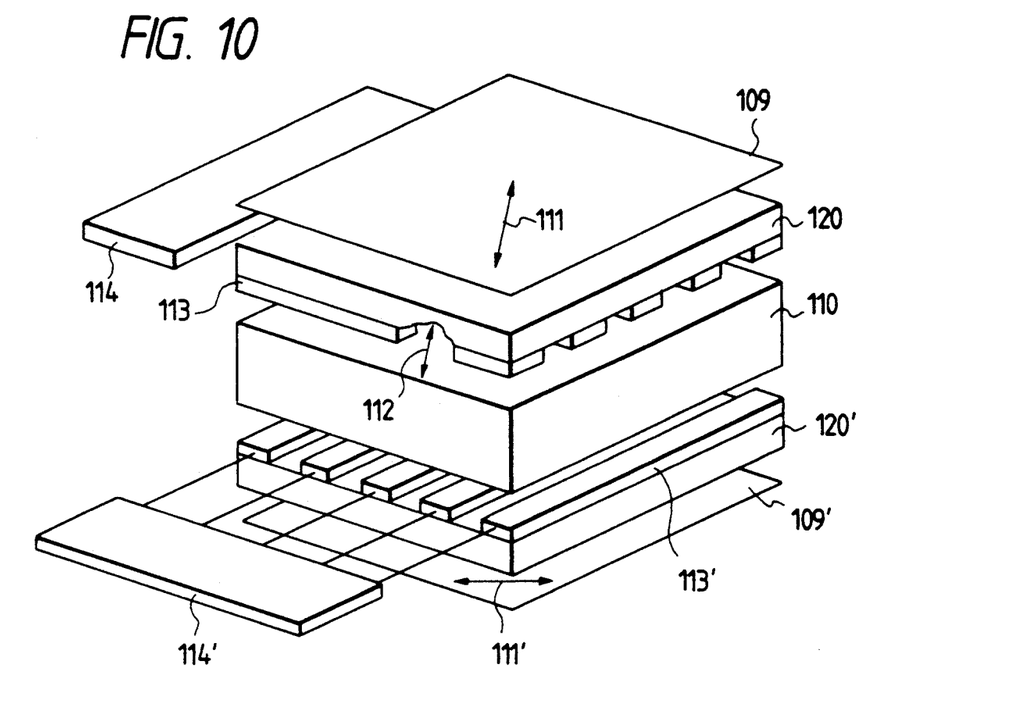
FIG. 10 shows, in exploded view, a liquid crystal display with pixel-type individual electrode arrangement.

FIG. 10 shows another embodiment of the present invention. The liquid crystal element of the present invention is used as a display element. Polarization plates 109 and 109' having polarization axis 111 and 111', a liquid crystal 110, matrix electrodes 113 and 113', one rubbing direction 112 being shown, electrode driving circuits 114 and 114', and substrates 120 and 120' being arranged as shown.

Figure 11:
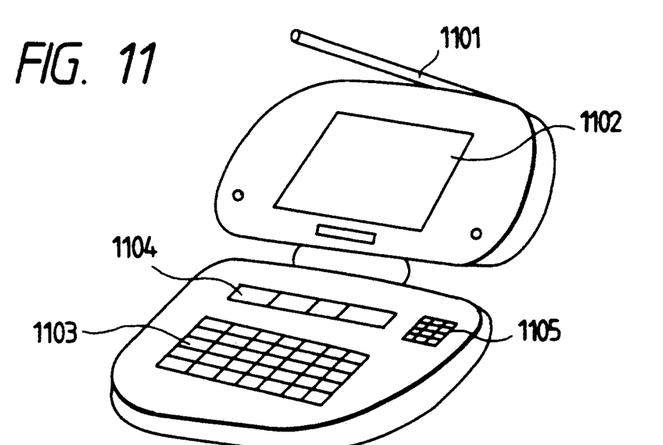
FIG. 11 shows, schematically, a PC with a liquid crystal display.

FIG. 11 is a perspective view of a laptop computer in which the liquid crystal display device of the present embodiment may be applied. The liquid crystal display device 1102 of the present embodiment fits in a cover position of the laptop computer. The cover position is constituted so that it is separable from a keyboard position forming function keys 1104, number keys 1105 and alphabet keys 1103. When they are separated, an antenna 1101 is adapted to be used as telecommunication receiving means.

Other aspects of this embodiment are the same as those in embodiments 1, 2 and 3. Since the liquid crystal element of the present invention achieves a highly efficient light utilization, the backlight is eliminated, and the size of the display is reduced to realize a small sized display which serves to lighten the laptop-computer.

ADVANTAGES OF THE INVENTION

According to the present invention, by providing a phase-plate inside a liquid crystal element, namely inside an electrode, the transmission rate is enhanced, black and white and color display are realized, the contrast ratio is further improved and the gradation display is also enabled.

REFERENCE NUMERAL LIST 1, 16, 21: Upper polarization plate
17, 28: Polarization axis of upper polarization plate
2, 30, 31, 146: Upper substrate of liquid crystal display element
10, 15, 21, 33, 40, 48: Lower substrate of liquid crystal display element
3, 18, 30, 36: Upper electrode of liquid crystal display element
4, 6: Upper and lower orientation layer
5: Liquid crystal
7: Phase plate
9, 23, 35, 42: Lower electrode of liquid crystal display molecule
8, 25, 43: Lower polarization plate
25, 44: Polarization axis of lower polarization plate
19, 31, 38: Rubbing direction of upper substrate
22, 34, 41: Rubbing direction of lower electrode substrate
26, 45: Backlight
13: Phase-plate
100: Liquid crystal
109, 109': Polarization plate
111, 111': Polarization axis
112: Rubbing direction
113, 113': Matrix electrodes
114, 114': Electrode driving circuits
120, 120': Substrates
209: Electrode
210: Glass plate
250: Filter
301: Upper polarization plate
302: Upper substrate
303: Phase-plate
305: Lower polarization plate
306: Light absorption axis (upper side)
308: Ferroelectric liquid crystal
309: Lower substrate
310: Light absorption axis (lower side)
1101: Antenna
1102: Liquid crystal display device
1103: Alphabet keys
1104: Function keys 1105: Number keys.

We claim:

1. A liquid crystal display device comprising,
   a) in sandwich arrangement from the outside to the inside:
      aa) a pair of substrates;
      bb) a pair of electrode structures at least one of which is transparent;
      cc) a liquid crystal material sandwiched between said pair of electrodes and substrates; and
      dd) a spacer and
   b) at least one film having birefringence sandwiched between said pair of substrates;
      wherein a display is effected by applying an electric field to said liquid crystal material through said electrode structures.

2. A liquid crystal display device according to claim 1 wherein more than two kinds of films having said birefringence property are sandwiched between said liquid crystal material and one of said substrates.

3. A liquid crystal display device according to claim 1 wherein said electrode structure is in a striped shape, such that a plurality of pixels are formed by mutually crossing stripe electrodes arranged on said pair of substrates wherein pixels with a first film having a first birefringence, pixels with a second film without any birefringence and pixels with a third film having a second birefringence are mixed.

4. A liquid crystal display device according to claim 1 further comprising a first polarization plate, wherein an angle between the optical axis of said film having birefringence and the polarization axis of the first polarization plate, or an angle between the optical axis and the absorption axis of said first polarization plate is 10° to 80°.

5. A liquid crystal display device according to claim 4 wherein said angle is about 45°.

6. A liquid crystal display device according to claim 1, wherein said film having birefringence is formed by a substantially non-colored and transparent polydiacetylene film doped with iodine, said film having substantially uniaxially oriented polyacetylene molecules.

7. A liquid crystal display device according to claim 1 wherein
   said liquid crystal material is a nematic liquid crystal having a positive dielectric anisotropy and containing a material having an optical rotation property, and a twisted spiral structure in the direction of the thickness is induced by an action of an orientation film or surface.

8. A liquid crystal display device according to claim 1, wherein said liquid crystal material is a ferroelectric liquid crystal.

9. A liquid crystal display device comprising, in sandwich structure,
   a pair of substrates,
   a pair of electrode structures,
   a liquid crystal layer sandwiched between said pair of substrates and electrode structures, and
   an optical birefringent device disposed between said pair of substrates including a solid layer type structure substantially transparent to a light employed wherein a pattern is formed in said structure by two areas, each area having a different birefringent property and said pattern is arranged within the light path of the liquid crystal display device.

10. A device according to claim 9
    wherein said electrode structures form a pattern of pixels,
    said pattern of areas of different birefringent properties and said pattern of pixels substantially correspond to each other and
    pixels with one type of birefringent property or one type of birefringent property combination are arranged in a periodically repeating structure.

11. A device according to claim 10 wherein the electrode structures are structures of parallel electrode stripes periodically defining liquid crystal pixels and wherein said pattern is defined such that the two areas having different birefringent properties have a matching periodicity.

12. A device according to claim 9 wherein the electrode structures are structures of parallel electrode strips periodically defining liquid crystal pixels and wherein said pattern is defined such that the two areas having different birefringent properties have a matching periodically.

13. A film consisting essentially of polydiacetylene, the polydiacetylene molecules being oriented predominantly in one direction, said film being substantially uncolored, transparent and birefringent, said film having adhesive properties.

14. A film accordance with claim 13 sandwiched without added adhesive between two layers at least one of which being transparent.

15. A film of claim 14 wherein said two layers are part of a liquid crystal display device.

* * * * *

UNITED STATES PATENT AND TRADEMARK OFFICE
CERTIFICATE OF CORRECTION

PATENT NO. : 5,179,457
DATED : 12 January 1993
INVENTOR(S) : Jun-ichi HIRATAKA et al.

It is certified that error appears in the above-indentified patent and that said Letters Patent is hereby corrected as shown below:

| Column | Line | |
|---|---|---|
| 1 | 30 | After "e.g." insert --,--. |
| 1 | 34 | Change "line only" to --linearly--. |
| 1 | 42 | Change "directs" to --directions--. |
| 1 | 62 | Delete "therefore". |
| 2 | 16 | After "electrode." start new paragraph and insert --DETAILED DESCRIPTION OF THE INVENTION--. |
| 2 | 36 | After "from" delete "and". |
| 2 | 60 | After "modules" change ":" to --;--. |
| 5 | 8 | Delete "between". |

UNITED STATES PATENT AND TRADEMARK OFFICE
CERTIFICATE OF CORRECTION

PATENT NO. : 5,179,457
DATED : 12 January 1993
INVENTOR(S) : Jun-ichi HIRATAKA et al.

It is certified that error appears in the above-indentified patent and that said Letters Patent is hereby corrected as shown below:

| Column | Line | |
|--------|------|---|
| 5 | 24 | Change "10 substrate" to --substrate 10--. |
| 5 | 25 | Change "10 substrate" to --substrate 10--. |
| 5 | 26 | Change "FIG. 1g" to --FIG. 1f--. |
| 5 | 44 | Delete "of". |
| 6 | 46 | After "This" insert --material--. |
| 7 | 31 | Change "was" to --is--. |
| 7 | 45 | Change "Upper" to --An upper--. |
| 7 | 55 | Change "is" to --are--. |

Signed and Sealed this

Twenty-ninth Day of March, 1994

Attest:

BRUCE LEHMAN

Attesting Officer        Commissioner of Patents and Trademarks